E. H. C. A. T. VULPIUS.
Millstone-Dressing Machine.
No. 221,634. Patented Nov. 11, 1879.
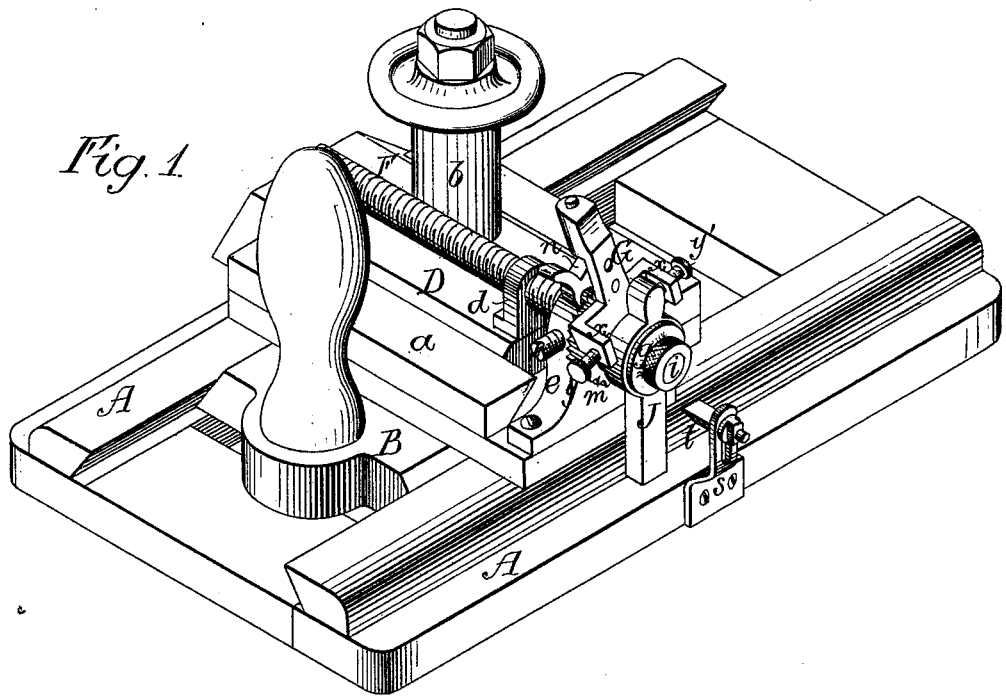
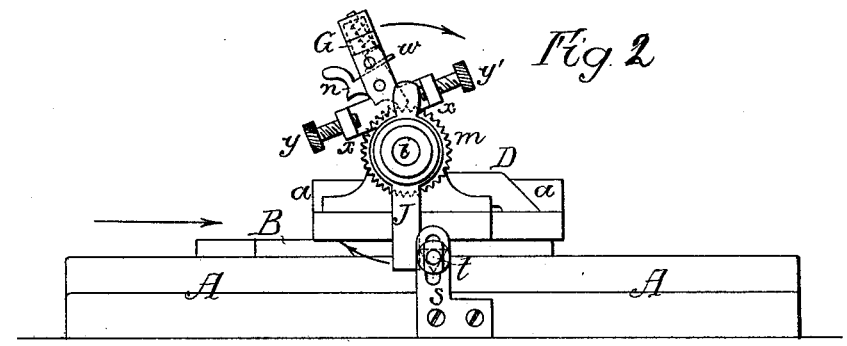
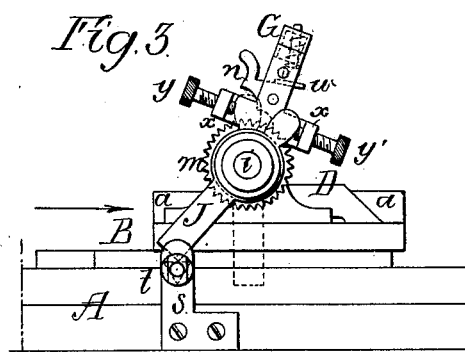
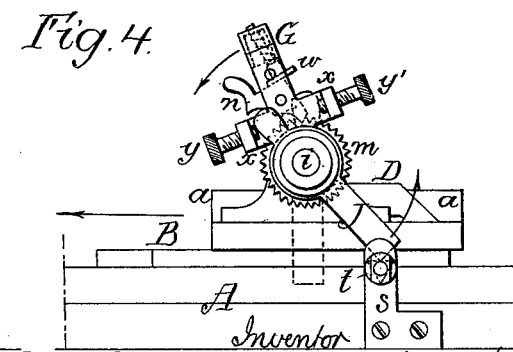
Witnesses
J. W. Deemer
Harry Smith
Inventor
Edler Herman Carl Alexander Theodore Vulpius
by his Attorneys
Howson and Son

UNITED STATES PATENT OFFICE.

EDLER H. C. A. T. VULPIUS, OF POTTSVILLE, PENNSYLVANIA, ASSIGNOR TO SAMUEL E. GRISCOM, OF SAME PLACE.

IMPROVEMENT IN MILLSTONE-DRESSING MACHINES.

Specification forming part of Letters Patent No. 221,634, dated November 11, 1879; application filed September 25, 1879.

*To all whom it may concern:*

Be it known that I, EDLER HERMAN CARL ALEXANDER THEODOR VULPIUS, of Pottsville, Schuylkill county, Pennsylvania, have invented a new and useful Improvement in Millstone-Dressing Machines, of which the following is a specification.

My invention relates to certain improvements in devices for traversing the diamond-carriage of the millstone-dressing machine, the object of the invention being to provide simple and efficient means for turning the feed-screw in one direction or the other. This object I attain in the manner which I will now proceed to describe, reference being had to the accompanying drawings, in which—

Figure 1 is a perspective view of a millstone-dressing machine with my improvements; and Figs. 2, 3, and 4, diagrams illustrating the working of the devices for operating the feed-screw.

A is the main frame or bed, to dovetail guides on which are adapted the beveled edges of the carriage B, the latter being provided with a suitable operating-handle, and having transverse guides $a$, to which is adapted the diamond-carriage D.

The carriage D has the usual tool-post $b$ and a stud, $d$, to a threaded opening in which is adapted the feed-screw F, the stem $i$ of the latter turning in a bearing, $e$, on the carriage B, to which bearing the said stem fits so closely that accidental turning of the screw is prevented.

To the stem $i$, outside of the bearing $e$, is secured a ratchet-wheel, $m$, and outside of the latter the said stem $i$ carries a frame, G, and a lever, J, the frame being fitted so closely to the stem that it will retain the position to which it is adjusted, while the lever J is hung loosely to the stem and is free to swing thereon. A nut, $g$, on the end of the stem $i$ serves to retain the frame G and lever J in their proper positions on the stem.

The frame G carries a double pawl, $n$, which has its rear edge made in the form of a blunt wedge, against which acts a spring-presser, $w$, carried by a tubular projection on the frame G, the tendency of said spring-presser being to retain the pawl in either of the two positions to whih it may be adjusted.

The frame G has two projecting lugs, $x$, to threaded openings in which are adapted set-screws $y$ $y'$, the latter being acted upon by the short arm of the lever J in the operation of the device, as hereinafter set forth.

To one edge of the frame A is secured a slotted plate, $s$, provided with a vertically-adjustable stud, $t$, for acting on the long arm of the lever J.

The operation of the device is as follows: Supposing the parts to be in the position shown in Fig. 2, and the carriage B to be moving in the direction of the arrow, the long arm of the lever J will come into contact with the stud $t$, and the lever will be moved in the direction of the arrow 1, the short arm of the lever bearing against the end of the set-screw $y'$, and thus causing a movement of the frame G in the direction of the arrow 2, the pawl $n$ engaging with the teeth of the ratchet $m$ and causing a like movement of the same. This movement continues until the parts are in the position shown by full lines in Fig. 3; but as soon as the long arm of the lever J is free from the control of the stud $t$ the lever will assume the vertical position shown by dotted lines in Fig. 3, the short arm of the lever bearing against the end of the set-screw $y$.

On the reverse movement of the carriage B there will be a reverse movement of the lever J and frame G, as shown in Fig. 4, the pawl $n$ slipping over the teeth of the ratchet $m$, so as not to turn the feed-screw F. As soon as the lever J is free from the control of the stud $t$ on this movement of the carriage, it assumes the vertical position shown by dotted lines in Fig. 4 and full lines in Fig. 2, so as to be operated, as above described, on the next forward movement of the carriage.

The direction in which the feed-screw is turned will depend upon which end of the pawl $n$ is in gear with the ratchet $m$.

The extent of movement of the lever J and frame G is governed by the adjustment of the stud $t$ and set-screws $y\ y'$.

I claim as my invention—

1. The combination of the feed-screw F, having a ratchet, $m$, the frame G, having a double pawl, $n$, and lugs $x$, the loosely-pivoted lever J, and a device for operating said lever, all substantially as set forth.

2. The combination of the feed-screw F, having a ratchet, $m$, the frame G, having a double pawl, $n$, and lugs $x$, with set-screws $y\ y'$, the lever J, and a device for operating said lever, as specified.

In testimony whereof I have signed my name to this specification in the presence of two subscribing witnesses.

EDLER HERMAN CARL ALEXANDER
  THEODOR VULPIUS.

Witnesses:
  FRANK LITTLE,
  C. LITTLE.